Patented May 3, 1927.

1,626,998

UNITED STATES PATENT OFFICE.

ROBERT S. WRIGHT, OF MINOT, NORTH DAKOTA.

NONCORRODING ANTIFREEZE COMPOSITION.

No Drawing.     Application filed October 25, 1926. Serial No. 144,184

My invention relates in general to materials for lowering the freezing point of liquids. The invention more particularly relates to compositions having a low freezing point, yet preventing corrosion, electrolysis and other detrimental action upon material in contact therewith.

The invention further relates to non-corroding, anti-freeze compositions or mixtures, which are simple, easy and cheap to make, efficient in operation and effective in results, and which are convenient and economical in handling and use, by reason of being the form of comparatively dry substances, adapted to be subsequently mixed with water as desired.

These features of my invention make it applicable for various purposes, and especially useful in heating and refrigerating systems and in the radiators of internal combustion engines.

Various other objects and advantages of the invention will be obvious from the following particular description of embodiments of my invention. The various features of novelty which characterize my invention are pointed out with particularity in the claims annexed to and forming a part of this specification, but for a better understanding of the invention, however, its advantages and specific objects attained with its use, reference should be had to the accompanying descriptive matter in which I have described the best forms of my invention.

Heretofore, there have been so-called anti-freeze mixtures in which calcium or sodium chloride has been used and a chromate has been added to stabilize the chloride and to some extent lessen the corrosive properties or tendencies of the chloride. However, it has been discovered that the chromate does not do away with the corrosive action.

The problem which confronted me and which I solved was to obtain a composition which would have a low freezing point and yet not permit corrosive, electrolytic or other harmful action upon material in contact therewith. By experimentation I have discovered that, if the metal or rubber parts are covered with an oily substance, corrosion and other harmful effects are eliminated. The problem was how to secure a proper diffusion or dispersion of the oil over these metal or rubber parts.

A mineral oil may be used in this preparation although olive oil or other oil may also be used. I have found that the introduction of potassium bicarbonate will result in dispersing the oil over these metal and rubber parts and molasses, gum acacia or gum tragacanth act as efficient agents for promoting the emulsification and dispersion of the oil.

The oily substance is dispersed throughout the mixture and it is found that oil has an affinity for and immediately becomes attached to any metal or rubber parts with which the mixture comes in contact, thereby preventing corrosion and other harmful effects such as electrolytic action on the radiator and engine parts, while there is enough oil in the mixture so that the parts to be protected will be covered with a film of oil as long as there is any mixture remaining. Thus I have prevented or eliminated corrosion and other harmful action and by means of my invention an ideal anti-freeze, non-corroding mixture is obtained.

For use in old radiators that may leak due to the solvent action of the solution on crystallized salts that may be present because of the use of bad water or otherwise, there may be introduced a small quantity of commercial ginger or other similar substance to stop or counteract the leak.

The invention will be more fully described in the following specific examples which are illustrative of different modifications of the invention. It is understood, however, that the invention is not limited to the specific steps or embodiments set forth in the examples:

*Example 1.*

About twenty (20) pounds of commercial anhydrous calcium chloride are mixed with about four (4) ounces of potassium bichromate. To this mixture is added about one (1) quart of mineral oil preferably having low viscosity and high boiling point. As emulsifying and dispersing agents, about one (1) quart of molasses and about one-eighth of a pound of potassium bicarbonate are added. These five substances which are mixed together may be formed into a comparatively dry substance. The resulting preparation may be mixed with about five (5) gallons of water, with or without agitation, making about five (5) gallons of solution.

Preferably commercial anhydrous calcium chloride is used, but the calcium chloride may be in any other form, and instead of calcium chloride, sodium chloride or other suitable chloride or other equivalent freezing-point depressant may be employed, the quantity used being dependent upon the material employed.

Also, instead of potassium bichromate, any other suitable chromate or bichromate may be used.

Instead of molasses, a small quantity of any other sugar solution may be used.

Also, instead of mineral oil, there may be substituted olive oil or any fatty animal or vegetable oil, but I consider the mineral oil as decidedly preferable.

Instead of the potassium bicarbonate, any other bicarbonate or not more than a trace of gum acacia or gum tragacanth may be substituted therefor.

In some cases, a small quantity of commercial ginger may be used to advantage for stopping radiator leaks in old radiators.

*Example 2.*

About four (4) pounds of commercial anhydrous calcium chloride are mixed with about one-half (½) ounce of potassium bicarbonate and about one (1) ounce of potassium bichromate. To this mixture is added about one-fourth (¼) pound of mineral oil. This is then mixed with about nine (9) pounds of water, with or without agitation, making about one (1) gallon of solution.

Preferably commercial anhydrous calcium chloride is used, but the calcium chloride may be in any other form, and instead of calcium chloride, sodium chloride or other suitable chloride or other equivalent freezing point depressant may be employed, the quantity used being dependent upon the material employed.

Also, instead of potassium bicarbonate, there may be substituted any other suitable bicarbonate or not more than a trace of gum acacia or gum tragacanth.

Instead of mineral oil, there may be substituted olive oil or any fatty animal or vegetable oil, but I consider the mineral oil as decidedly preferable.

Also, in place of potassium bichromate, any other suitable bichromate may be used.

In some cases, a small quantity of commercial ginger may be used to advantage for stopping leaks in old radiators.

By means of the embodiments of my invention above set forth, there is attained not only greater convenience and better results in the mixing of the component parts, but also when the oil is emulsified and dispersed by the molasses, bicarbonate, gum acacia, gum tragacanth or other emulsifying and dispersing agents, a thin film of oil is dispersed over and clings to every portion of the metal and rubber parts of the radiator and engine with which the composition comes in contact, and thus protects these metal and rubber parts against any corroding tendency remaining after the stabilization of the calcium chloride by the introduction of the chromate or potassium bichromate.

According to my invention, the material of my composition may be prepared as a relatively dry substance, using the different ingredients in the proper proportions, so that all that remains to be done is to mix it with the proper amount of water to form a non-corroding, anti-freeze composition for use in heating or refrigerating systems or in the radiators of internal combustion engines or for various other purposes for which it is applicable.

With my invention, a simple, cheap and efficient anti-freeze composition is provided and its relatively dry form permits not only of greater ease in handling and use but also of considerable saving by reason of its reduced bulk and the consequent reduced shipping and storage charges, not possible with other compositions which have the water added initially and prior to sale and shipment of the composition.

While I have described and have pointed out in the claims, annexed hereto, certain novel features of the invention, it will be understood that various omissions, substitutions and changes in the embodiments of the invention described may be made by those skilled in the art without departing from the spirit of the invention.

Having thus described my invention, what I claim as new and desire to secure by Letters Patents, is:

1. A composition comprising an aqueous mixture of calcium chloride, potassium bichromate, mineral oil, molasses and potassium bicarbonate.

2. An anti-freeze composition non-corrosive to metal comprising an aqueous medium having a freezing temperature depressant chloride, an alkali metal bichromate, a sugar solution, an oil having low viscosity and high boiling point and an alkali bicarbonate.

3. An anti-freeze mixture comprising about twenty (20) pounds of commercial anhydrous calcium chloride, about four (4) ounces of potassium bichromate, about one (1) quart of mineral oil, about one (1) quart of molasses, about one-eighth pound of potassium bicarbonate and about five (5) gallons of water.

4. A composition comprising an aqueous mixture of calcium chloride, potassium bicarbonate, mineral oil and potassium bichromate.

5 An anti-freeze composition non-corrosive to metal comprising an aqueous medium having a freezing temperature depressant chloride, an alkali metal bicarbonate, mineral oil and an alkali metal bichromate.

6. An anti-freeze mixture comprising about four (4) pounds of commercial anhydrous calcium chloride, about one-half (½) ounce of potassium bicarbonate, about one-fourth (¼) pound of mineral oil, about one (1) ounce of potassium bichromate and about nine (9) pounds of water.

7. A composition in the form of a comparatively dry substance adapted to be subsequently mixed with water, comprising calcium chloride, potassium bichromate, mineral oil, molasses and potassium bicarbonate.

8. A composition in the form of a comparatively dry substance adapted to be subsequently mixed with water, comprising a freezing temperature depressant chloride, an alkali metal bichromate, a sugar solution, an oil having low viscosity and high boiling point and an alkali metal bicarbonate.

9. A composition in the form of a comparatively dry substance adapted to be subsequently mixed with water, comprising about twenty (20) pounds of commercial anhydrous calcium chloride, about four (4) ounces of potassium bichromate, about one (1) quart of mineral oil, about one (1) quart of molasses, and about one-eighth pound of potassium bicarbonate.

10. A composition comprising an aqueous mixture of calcium chloride, potassium bichromate, mineral oil, molasses, potassium bicarbonate and ginger.

11. An anti-free composition non-corrosive to metal comprising an aqueous mixture having a freezing temperature depressant chloride, mineral oil, an alkali metal bichromate and gum tragacanth.

12. An anti-freeze mixture comprising about four (4) pounds of commercial anhydrous calcium chloride, about one-half (½) ounce of potassium bicarbonate, about one-fourth (¼) pound of mineral oil, about one (1) ounce of potassium bichromate, about nine (9) pounds of water and not more than a trace of gum tragacanth.

13. A composition comprising an aqueous mixture of calcium chloride, potassium bichromate, mineral oil, molasses, potassium bicarbonate and gum tragacanth.

14. An anti-freeze composition non-corrosive to metal comprising an aqueous medium having a freezing temperature depressant chloride, mineral oil, an alkali metal bicarbonate and gum tragacanth.

ROBERT S. WRIGHT.